US005356350A

United States Patent [19]

Schreiber

[11] Patent Number: 5,356,350

[45] Date of Patent: Oct. 18, 1994

[54] MOTOR-DRIVEN SCREWDRIVER WITH VARIABLE TORQUE SETTING FOR EQUAL TORQUES REGARDLESS OR COUNTERTORQUES BY FASTENERS

[75] Inventor: Wolfgang Schreiber, Stuttgart, Fed. Rep. of Germany

[73] Assignee: C. & E. Fein Gmbh & Co., Stuttgart, Fed. Rep. of Germany

[21] Appl. No.: 913,238

[22] Filed: Jul. 14, 1992

[30] Foreign Application Priority Data

Jul. 15, 1991 [DE] Fed. Rep. of Germany ....... 4123349

[51] Int. Cl.[5] ........................ F16H 35/10; F16D 7/06; B25B 23/14

[52] U.S. Cl. ...................................... 475/153; 81/473; 192/150

[58] Field of Search ......................... 81/467, 473, 474; 173/146, 176, 178, 181; 192/56 R, 150; 475/153, 257, 263, 264, 298, 301; 464/36, 38, 39, 160

[56] References Cited

U.S. PATENT DOCUMENTS 3,613,751 10/1971 Juhasz ............................ 192/150 X
3,616,883 11/1971 Sindelar ............................ 81/474 X
3,667,250 6/1972 Schnepel .............................. 464/36
4,006,608 2/1977 Vuceta ............................. 464/36 X
4,368,784 1/1983 Wünsch et al. ..................... 173/176
4,631,992 12/1986 Eckman ........................... 81/473 X
4,712,456 12/1987 Yuan .............................. 173/178 X
4,756,216 7/1988 Lo ........................................ 81/473
4,836,349 6/1989 Sakamoto et al. .............. 192/150 X
4,869,131 9/1989 Ohmori .......................... 173/178 X
4,913,242 4/1990 Lo ....................................... 173/178
4,923,047 5/1990 Fink et al. .......................... 192/150

FOREIGN PATENT DOCUMENTS 2726818 6/1977 Fed. Rep. of Germany .
3742952 12/1987 Fed. Rep. of Germany .

*Primary Examiner*—Dirk Wright
*Assistant Examiner*—Khoi Q. Ta
*Attorney, Agent, or Firm*—Barry R. Lipsitz

[57] ABSTRACT

A motor-driven machine with variable torque setting feature, especially a screwing machine with a torque-controlled switching-off feature, has a shaft which is driven by a motor via a transmission for driving a tool, and a setting ring for presetting a torque at which the shaft is to be disconnected from the transmission and/or the motor will be switched off. In order to enable approximately identical torque curves to be achieved for hard and for soft screwing applications, a clutch with a variable tripping torque is provided whose tripping torque can be adjusted via an indexing ring, which latter can be adjusted together with the setting ring.

21 Claims, 7 Drawing Sheets

MOTOR-DRIVEN SCREWDRIVER WITH VARIABLE TORQUE SETTING FOR EQUAL TORQUES REGARDLESS OR COUNTERTORQUES BY FASTENERS

The present invention relates to a motor-driven machine with variable torque setting, in particular to a portable electric a screwing machine with a variable torque setting, having a shaft which is driven by motor via a transmission for driving a tool, and setting means for pre-setting a torque at which the shaft is to be disconnected from the transmission and/or at which the motor will be switched off.

A screwing machine of this type has been disclosed by Fink et al. (U.S. Pat. No. 4,923,047). In tis prior art design, a working spindle is driven by a motor via a two-stage planetary transmission. The first stage of the planetary transmission comprises a motor pinion driving planet wheels which are held on a planet carrier and supported in an internal gear cylinder. The second stage is coupled to the planet carrier by means of a second internal gear cylinder which is fixed against rotation in the housing. The first internal gear cylinder, at the drive end, is arranged to rotate and to actuate a motor cutoff device, against the action of a torsion spring, when a presettable threshold torque value is exceeded.

When a machine of this type is employed as a screwing machine for tightening screws at a predetermined torque, then one must distinguish between two general cases: "hard screwing" on the one hand, with an additional angle of rotation of up to approximately 30° max., and "soft screwing", with a larger additional angle of rotation of, generally, more than 360°.

When tightening screws using the known screwing machine, the torque for a screw can be adjusted very precisely for the soft screwing application, the counter-torque rising only slowly as the screw is being tightened. In hard screwing applications, a considerably higher torque is obtained for the same machine setting, since the counter-torque rises abruptly when the final position of the screw is reached, and the angular momentum still prevailing in the entire transmission system leads to additional tightening of the screw. In hard screwing applications, the actual torque of the screw cannot be predetermined exactly, being determined to a great extent by the additional angle of rotation. This has the consequence that in hard screwing applications, the machine setting required to obtain a given torque must be determined by trial in each case. In soft screwing applications, in contrast, the torque of the screwing machine develops in a reproducible manner, as a function of the setting.

It is an object of the present invention to improve a motor-driven machine of the before-mentioned type in such a way that, irrespective of the amount of the additional angle of rotation, approximately identical torque curves are obtained for the hard and the soft screwing cases, in response to the setting of the machine.

According to the present invention, this object is achieved by a motor-driven machine with a variable torque setting, in particular a portable electric screwing machine with a variable torque setting comprising a motor arranged within a housing, a transmission driven by said motor and driving a shaft for driving a tool, de-energizer means operably connected with said transmission for de-energizing said motor at a preset torque, first setting means operably connected with said de-energizer means for presetting said de-energizer means to a desired first torque, at which said de-energizer means is activated, further comprising a clutch arranged between said transmission and said shaft, said clutch having a variable tripping torque for disengaging said shaft from said transmission at a preset torque, and further comprising second setting means operably connected with said clutch for presetting said second torque, and operably connected with said first setting means for a common setting of said first torque preset by said first setting means and of said second torque preset by said second setting means.

Alternatively, instead of a de-energizing means an additional clutch may be provided which is operably connected to said first setting means for disengaging said transmission from the other clutch transmitting the torque to the shaft when a first torque preset by said first setting means is reached. The additional coupling will disengage in soft screwing applications before the other clutch disengages, while in hard screwing applications the other clutch will disengage first.

According to the first mentioned embodiment of the invention, a screwing machine comprises a second setting means for a clutch with variable tripping torque, in addition to a first setting means for presetting a torque. By adjusting the second setting means together with the first setting means, the tripping force of the clutch is adjusted as a function of the desired torque. The additional torque encountered in a hard screwing application with a screwing machine according to the prior art, due to dynamic reasons, is compensated in this way by premature tripping of the clutch. When the torque adjusted by means of the first setting means is high, the clutch will be tripped later than in the case of a lower torque. All in all, the screwing machine can be designed in such a way that the torque will develop approximately identically for hard and soft screwing cases. In hard screwing cases, the achievable torque is predetermined by the adjustment of the tripping force of the clutch effected by means of the second setting means. In soft screwing cases, in contrast, the drive preferably is disconnected as a function of the setting of the first setting means.

According to a preferred further development of the invention, the clutch comprises two clutch halves which can be connected one with the other in form-locking relationship and which are prestressed toward each other by a spring. The form-locking design of the clutch guarantees reproducible tripping moments and no-wear operation. The spring tension can be selected, and the second setting means can be tuned to the spring tension in such a way that largely identical torque curves will be obtained for the hard and the soft screwing case.

In addition, during disengagement of the two clutch halves, a counter-torque is transmitted to that clutch half which is connected to the transmission, which causes the first setting means to respond and, thus, the motor to be switched off.

Although this is not normally intended, it is in fact possible, by increasing the prestress of the spring to adjust the screwing machine in such a way that the clutch will disengage only at a higher torque in a hard screwing application.

This will lead to generally higher torques in the hard screwing case than with the basic setting of the screwing machine. In certain applications, the ability to provide a higher torque may be used for permitting a screwing machine, which otherwise would be insufficiently rated, to be used also for achieving a higher torque in a hard screwing case. This may be of advantage, in particular, when a suitably rated screwing machine is not at hand at the particular moment and when adhering to an exact torque is not particularly important.

An especially space-saving structure of the clutch is obtained when the shaft passes through the clutch coaxially.

According to another advantageous embodiment of the invention, the clutch halves comprise rolling elements engaging each other in form-locking relationship. In this case, the first clutch half preferably is equipped with a roller retainer in which a plurality of rollers are held in rolling relationship, and the second clutch half comprises a corresponding number of balls engaging the spaces between the rollers in form-locking relationship. In this way, a simple form-locking connection and safe disengagement against the spring action is ensured. The roller retainer, preferably, is designed in the form of a flange, and the rollers are arranged in such a way that the axes of rotation of the rollers point in radially outward directions. This also simplifies the structure of the clutch.

The transmission of the screwing machine is preferably of the planetary type, whereby a particularly space-saving structure is rendered possible. In addition, a planetary gearing also permits use of the dynamics of the hard screwing case to be made in order to produce a higher torque by a corresponding setting of the screwing machine. As has been mentioned before, this effect may be utilized for a screwing machine, which otherwise would be insufficiently sized, in order to achieve a higher tripping force in a hard screwing application than would be available with the basic setting.

When a planetary gearing is used, one of the two clutch halves is preferably connected to a hollow wheel of the gearing so as to rotate therewith, while the other one of the two clutch halves is fixed on the housing. In principle, however, the clutch may be coupled to other transmissions of any kind, as long as setting means are provided for presetting a torque at which the motor is to be switched off and/or at which the shaft will be disconnected from the drive.

According to a further preferred embodiment of the invention, the transmission is configured using multistage planetary gearing and comprises a first internal gear cylinder which is rotatably seated and is fixed on the housing, via a first setting means, in such a way as to allow its limited rotation, in response to the torque, while a second internal gear cylinder of the planetary gearing is connected to the first clutch half for rotation therewith. One obtains in this way a favorable connection of the clutch to the planetary gearing, while the primary stage of the transmission can be designed in the known manner, for switching off the motor in response to the torque.

According to a preferred improvement of the second setting means, the latter is provided with an adjusting nut, which is fixed in the housing for adjustment in an axial direction by means of a thread, in order to vary prestressing the spring.

This provides a simple setting means for prestressing the spring and, thus, for the tripping force of the clutch.

The spring preferably is designed as a cup spring, since a cup spring provides the possibility of combining a compact design with high spring force.

According to another convenient embodiment of the invention, the first setting means comprises an indexing ring which is connected in driving relationship to the adjusting nut, for adjustment in common with the second setting means. Such an arrangement permits simple coupling of the first setting means to the second setting means.

According to another preferred embodiment of the invention, a threaded sleeve is screwed into the housing, and axial pins are mounted in the bushing for axial displacement, for prestressing the spring via a set collar which is adjustably fixed on the threaded sleeve. In this way, any unwanted unscrewing of the housing, which may lead to certain of its built-in elements coming off, is safely prevented. At the same time, the set collar can be adjusted in axial direction, without this leading to an axial movement of the shaft. In addition, it is also possible with this embodiment of the invention to provide a threaded bolt allowing additional devices, such as a corner screw-driver, to be coupled.

According to a further preferred embodiment of the invention, the set collar is screwed upon a threaded end of the threaded sleeve, and is connected with the indexing ring of the first setting means to rotate therewith. This feature simplifies the axial adjustment of the indexing ring to vary the initial stress of the spring.

According to a convenient further embodiment of the invention, the axial adjusting distance of the set collar is limited on both sides. This result is ensured a by providing a radial end face of the threaded sleeve on the side of the spring and a stopper ring on the opposite side. The setting range of the spring tension can be limited in this way to technically meaningful values.

The connection for common rotation between the set collar and the indexing ring can be achieved in a particularly simple way by plurality of ribs adapted to mate.

In the embodiments of the invention the prestressing of the spring is effected in combination with the adjustment of the first setting means. Changing the prestressing of the spring without simultaneously adjusting the first setting means is possible only by removing the indexing ring. Another embodiment of the invention offers the possibility of varying the prestressing of the spring independently of the position of the indexing ring of the first setting means. This embodiment is of advantage if the user is to be given a simple means for adjusting the screwing machine with a view to raising the torque curve in hard screwing applications.

To this end, a spring-loaded sliding sleeve is arranged on the set collar for axial displacement, which sleeve is connected to the set collar via a driven tooth arrangement entraining it in rotation. In its rest position, the sliding sleeve is in contact with the indexing ring and is connected therewith in driving relationship via mated ribs. In this position, the set collar of the second setting means can be adjusted only in common with the indexing ring of the first setting means. In such an embodiment when the prestressing of the spring is to be changed independently of the setting of the indexing ring of the first setting means, the sliding sleeve can be withdrawn, against the force of the spring, from the indexing ring and into an adjusting position in which the ribs are no longer in engagement with those of the indexing ring so that the set collar can be rotated relative to the indexing ring.

According to a convenient embodiment, means are provided in this arrangement for limiting the angle of adjustment of the sliding sleeve relative to the indexing ring. For this purpose, an encoding disk may be fixed on the indexing ring, which encoding disk may be provided with a segment-shaped link guide which is engaged by a cam of the sliding sleeve for limiting the adjusting angle. Such a feature enables the adjustment of the initial stress of the spring to be limited to a meaningful range—a measure which is regarded as convenient because of the effect even a very small axial displacement of the set collar has on the tripping force of the clutch.

The invention will now be described in more detail by way of certain preferred embodiments, with reference to the drawing in which:

FIG. 1 shows a partial longitudinal section through a first embodiment of a screwing machine according to the invention;

FIG. 1*a* shows an elevation of the pressure disk receiving the balls according to FIG. 1;

FIG. 1*b* shows an elevation of the roller retainer receiving the rollers according to FIG. 1;

Figure 1:
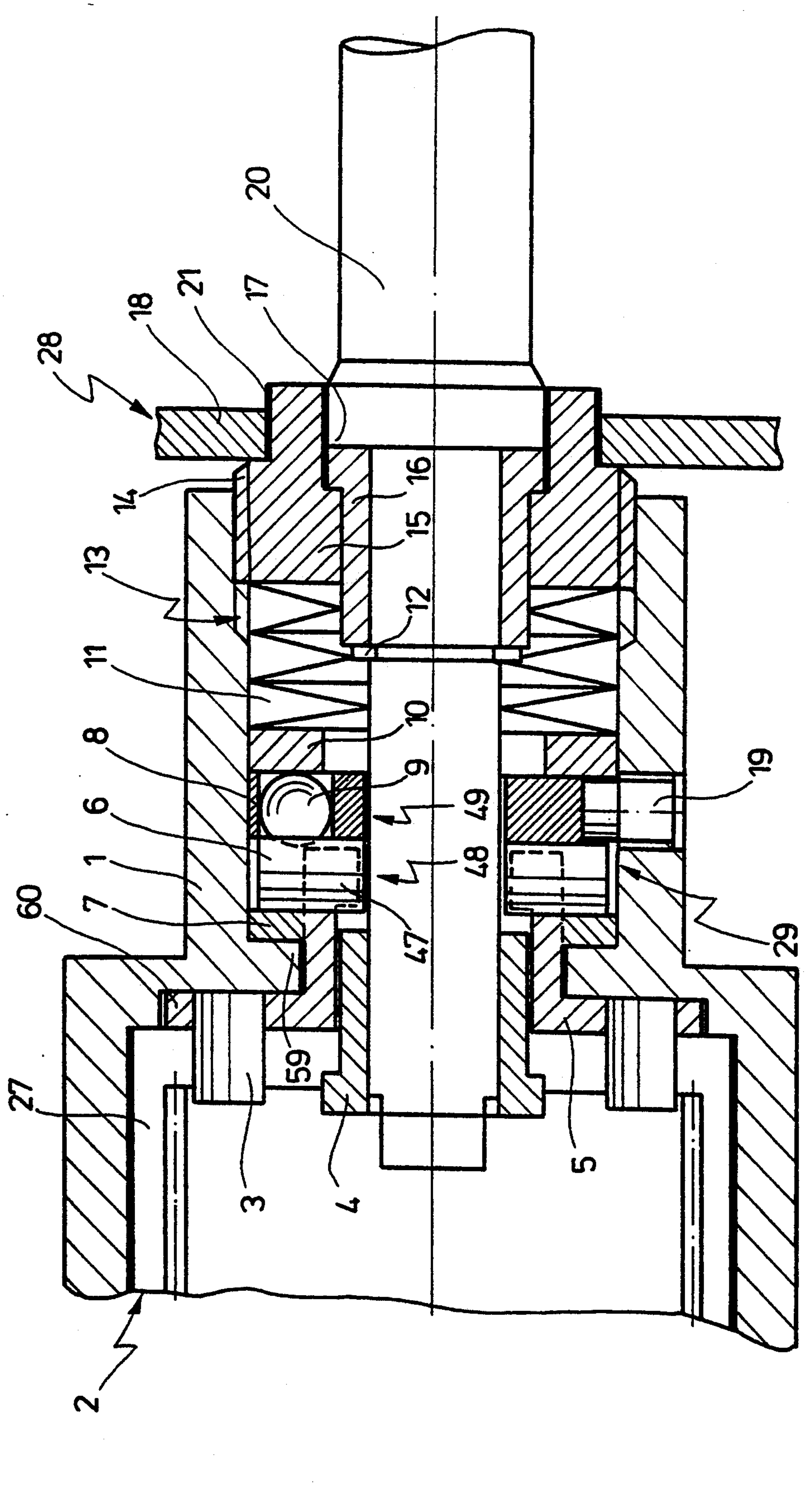

A screwing machine according to the invention, as illustrated in FIG. 1, is configured as a hand tool and is driven in the known manner by a drive motor 70 (FIG. 6), via a two-stage planetary gearing, as disclosed by U.S. Pat. No. 4,923,047. The planetary gearing 2, thus, has a first reduction stage 74 with the motor pinion 72 serving as a sun wheel. The motor pinion 72 drives planet wheels 78 which are arranged around its circumference and which are rotatably seated on a planet carrier 80 provided in coaxial arrangement relative to the axis of rotation of the motor shaft. The teeth of the planet wheels 78 engage on the one hand the motor pinion 72 and, on the other hand, the interior teething of a first rotatably seated internal gear cylinder 82. The first reduction stage 74 is coupled, via the planet carrier 80, to the second reduction stage 76 whose planet carrier drives the shaft 20. The second reduction stage comprises an internal gear cylinder 27 which, contrary to the known arrangement, instead of being fixed against rotation on the housing 1, is fixed on and rotates with a first clutch half 48 of a clutch indicated generally at 29, which will be described in more detail hereafter and whose second clutch half 49 is fixed on the housing 1.

The internal gear cylinder of the first reduction stage of the transmission indicated generally by reference numeral 2 is rotatably seated, and is held by a pivoted lever whose initial stress can be adjusted by means of a torque rod (i.e. torsion spring).

Figure 2:
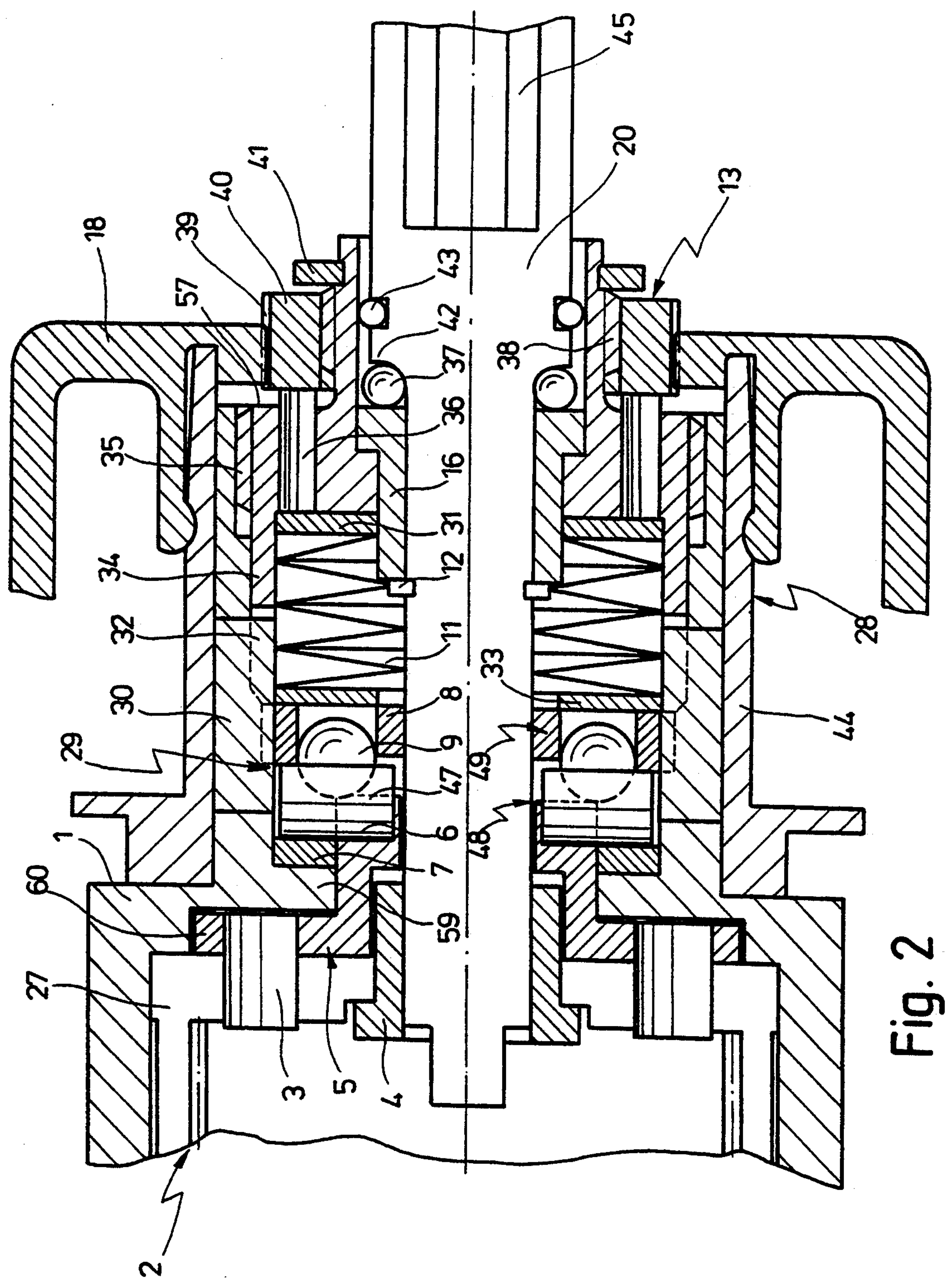
FIG. 2 shows a partial longitudinal section through a second embodiment of a screwing machine according to the invention.

The prestress bias of the torque rod can be varied via an indexing ring 18, in combination with a setting sleeve 48 and a link ring 44, as indicated in FIG. 2. Depending on the angular position of the indexing ring 18, the initial stress of the torque rod changes in the known way with the consequence that the motor will be switched off by switch 92 when a predetermined torque is reached, through a rotary movement of the shift fork (i.e. swivel element) 86 provoked by the counter-torque acting on the first internal gear cylinder.

Except for the clutch 29, with an associated setting device, being interposed between the second internal gear cylinder 27 of the transmission 2 and the housing 1, the structure of the screwing machine corresponds to that of the screwing machine according to U.S. Pat. No. 4,923,047 to which particular reference is made for further details of the known, prior art components.

Figure 6:
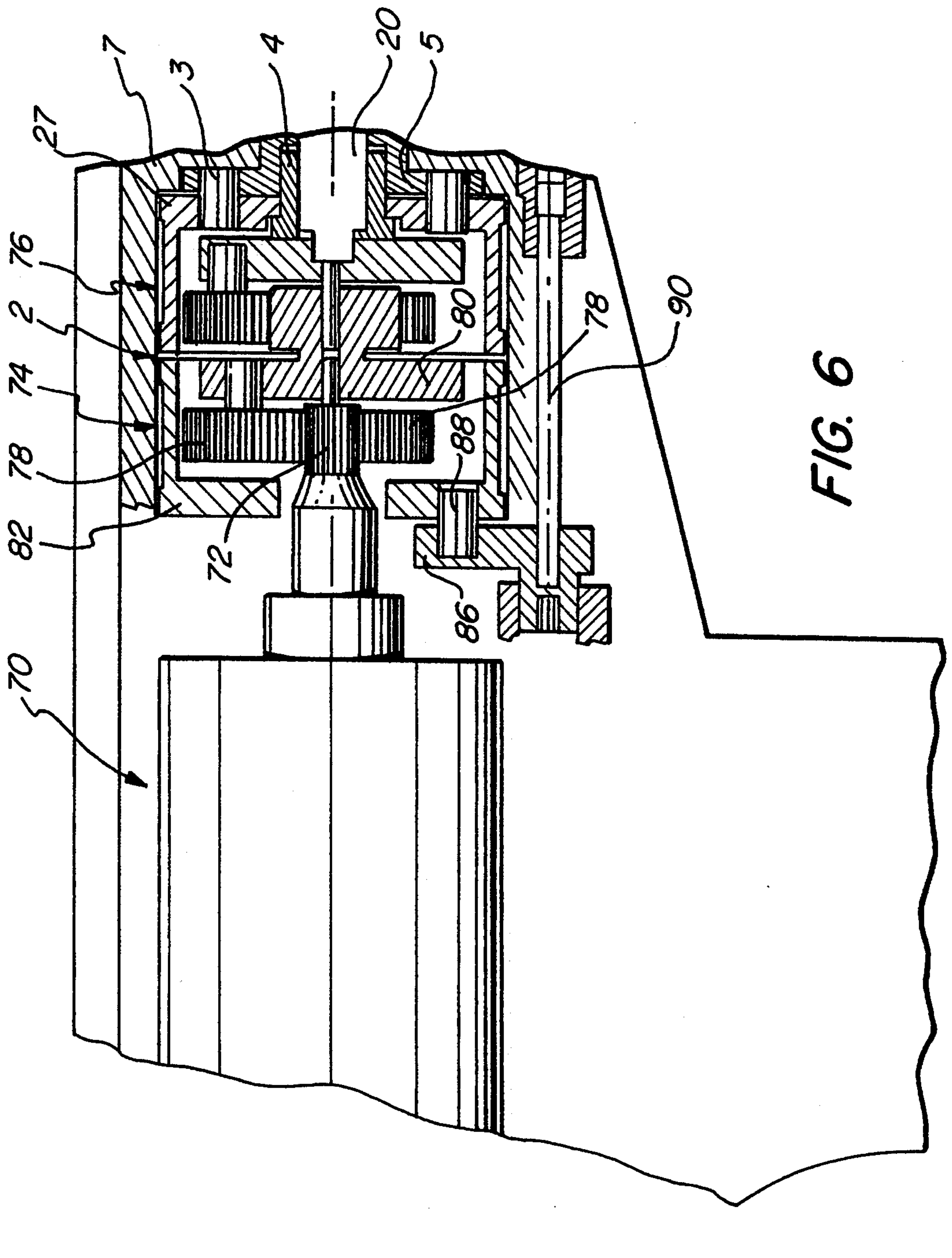
FIG. 6 shows a partial longitudinal section through the drive components of a screwing machine according to the invention.
Figure 7:
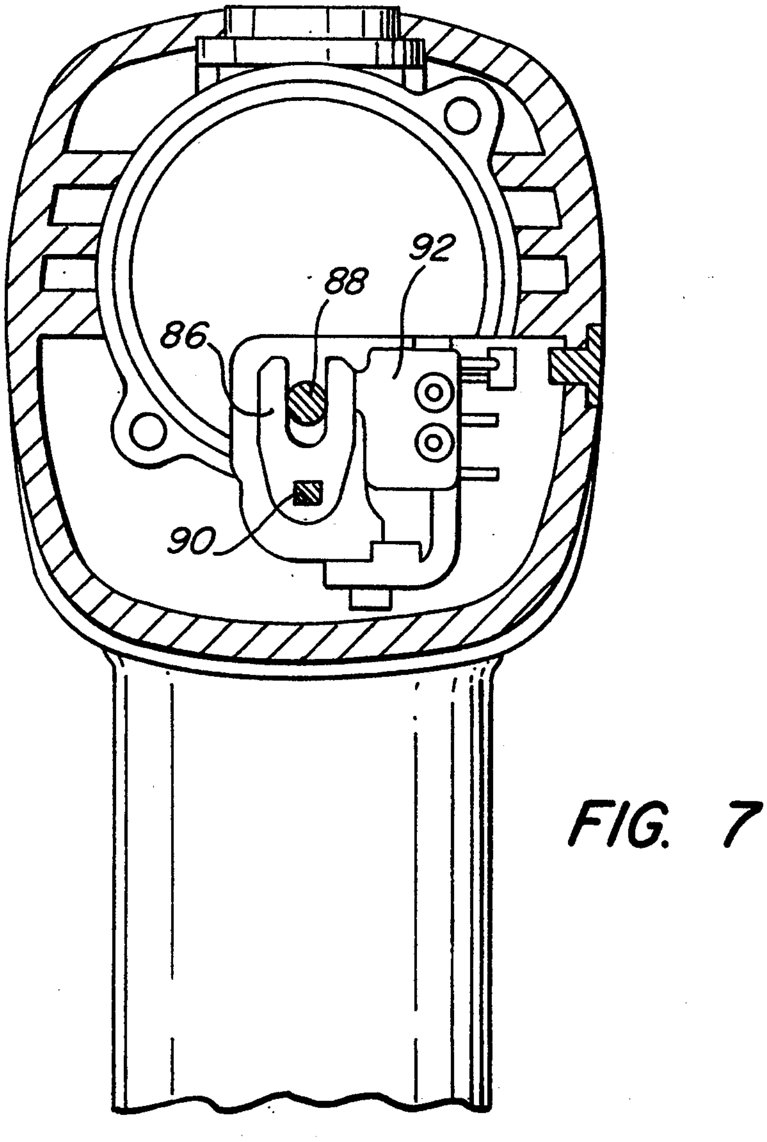
FIG. 7 shows a front sectional view of portions of said drive components.

In the drawings, the first setting means are indicated only in part by reference numeral 28. These means enable the initial stress acting on the shift fork to be varied, via the torque rod. Details of the internal gear cylinder 27 of the transmission 2, which is connected to the clutch 29 according to the invention, are illustrated in FIG. 6.

Figure 3:
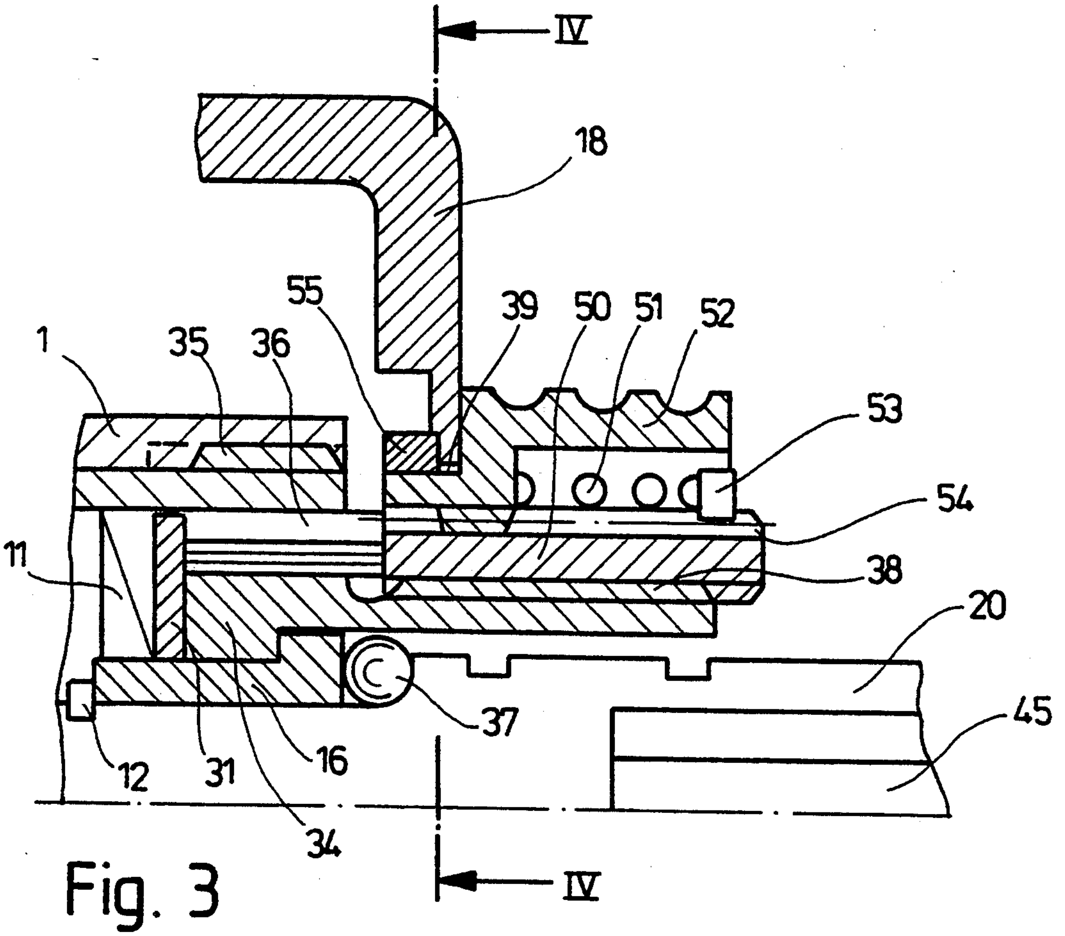
FIG. 3 shows a partial longitudinal section through a third embodiment of a screwing machine according to the invention.

The shaft 20, which is driven by the planet wheel carrier of the second transmission stage is intended to drive a screwing head, which fact is indicated in FIGS. 2 and 3 by a bit receptacle 45 in which the screwing head can be fitted by means of a suitably shaped shank portion.

Figure 1A:
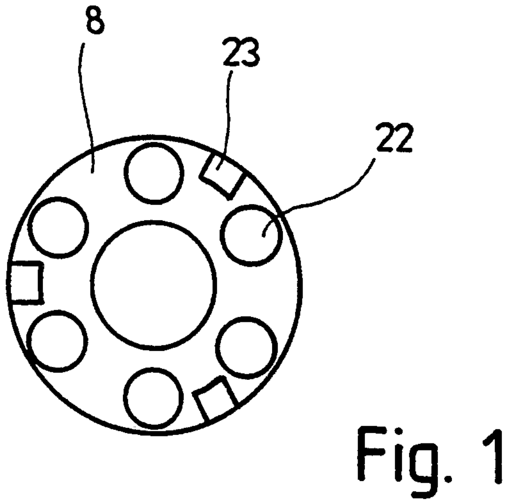
Figure 1B:
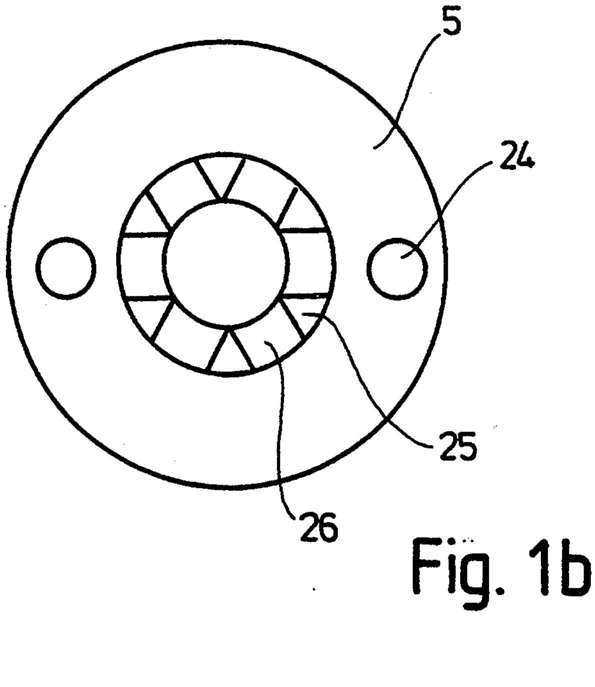

The second internal gear cylinder 27 is supported on the shaft 20, via an injection-molded bearing bush 4, the shaft being slidably supported in a roller retainer 5 having the shape of a flange. The roller retainer 5 has an annular section 60 on its transmission end, which is drivingly connected, by two axial pins 3, to the gear cylinder 27, and is retained by its central portion in an annular web 29 on the housing 1. The end of the roller retainer 5 opposite the transmission 2 is provided with an end face in which six wide grooves 26 extending in a radial direction are disposed, separated one from the other by triangular webs 25, for receiving rollers 6, as can be seen best in FIG. 1*b*. The axes of rotation 47 of the rollers 6 extend in radially outward directions and are equally spaced one from the other by 60° . On their sides facing the shaft 20, the rollers 6 are guided in the grooves 26 and bear upon the outer face of a supporting disk 7, which is in contact with the annular web of the housing 1, on the side opposite the transmission 2. The roller retainer 5 is followed by a pressure disk 8 of a shape which can be seen best in the view of FIG. 1*a*. The pressure disk 8 comprises three marginal grooves 23, equally spaced by 120°, which are engaged by stud screws 19 screwed into the housing 1 in radial direction, so as to fix the pressure disk 8 against separate rotation. The pressure disk 8 is provided with six bores 22, which are equally spaced by 60° and which accommodate balls 6 engaging the spaces between the rollers 6 in form-locking relationship. The diameter of the rollers 6 is selected in such a way that the rollers act as a thrust bearing between the supporting disk 7 and the pressure disk 8. The sides of the balls 9 opposite the roller retainer 5 rest against an axial disk 10, which is loaded by a spring 11 designed in the form of a cup spring and acting in the direction of the rollers 6. On the transmission side, the spring 11 rests against the axial disk 10, while its other end is in contact with the end face of an adjusting nut 15 which has its thread 14 screwed into the housing 1.

A bearing bush 16 fitted on the shaft 20 is fixed, on its transmission end, by a circlip ring 12, while its opposite end facing away from the transmission rests against a shoulder 17 of the shaft 20 and is held in a central bore of the adjusting nut 15. The indexing ring 18 of the first setting means, which is indicated only generally by reference numeral 28, embraces the end of the adjusting nut 15 opposite the transmission 2, and is drivingly connected to the adjusting nut 15 by mating ribs 21. The initial stress of the spring 11 can be adjusted by turning the adjusting nut 15 at the housing 1. Depending on the initial stress so adjusted, the spring 11 is compressed, when a given threshold torque M is reached, by an amount sufficient to cause the balls 9 to move from their position between the rollers 6 and into the next interspace. As the rollers 6 cross the balls 9 abruptly, a counter-torque in a direction opposite to the sense of rotation of the shaft 20 is transmitted to the rollers 6 and, thus, to the second gear cylinder 27 of the transmission. The initial stress of the spring 11 is adjusted in such a manner that the described yielding of the clutch occurs only in hard screwing applications and that the counter-torque produced by such one-time yielding of the clutch causes the motor to be switched off via the shift fork of the first setting means 28. At the same time, the initial stress of the spring 11 is selected in such a way that the clutch 19 will not respond in soft screwing applications and the motor will not be switched off in this case by the first setting means 28 when a given threshold torque is reached. Given the fact that the indexing ring 18 of the first setting means 28 is drivingly coupled to the adjusting nut 15, any increase of the cutoff torque of the first setting means simultaneously has the effect to increase the initial stress of the spring 11, with the consequence that an approximately linear torque curve is obtained over the entire setting range of the setting means 28. Similarly, an approximately identical torque curve is also obtained, whether the screwing case is a soft or a hard screwing application.

When the indexing ring 18 is drawn off the meshed looking ribs of the adjusting nut 15, then the initial stress of the spring 11 can be adjusted independently of the angular position of the indexing ring 18.

When the initial stress of the spring 11 is considerably increased, compared with the value required for achieving the above described behavior which generally occur in response to a displacement by less than one millimeter—the clutch 29 will respond only at a higher torque, in a hard screwing case. This means that with this setting the angular momentum of the transmission is utilized for increasing the tripping torque in hard screwing applications. It is, therefore, possible to intentionally adjust the screwing machine in such a way as to provoke this effect, which normally is undesirable with screwing machines according to the prior art, in order to increase the torque for a hard screwing application. This may be desirable in exceptional cases when a screwing machine of normally insufficient rating is to be used, and a higher torque is to be achieved in a hard screwing application.

FIG. 2 shows a slightly modified embodiment of a screwing machine according to the invention, where the initial stress of the spring 11 can be adjusted by corresponding displacement of axial pins 36. While the general structure of the clutch is unchanged, the pressure disk 8 is connected to the housing 1 via two feather keys 30. The transmission end of the spring 11 rests against an axial disk 33, its opposite end against an axial disk 31.

The axial disk 31 in its turn rests against a threaded bush 34 which is screwed into the housing 1, and is provided on its transmission end with longitudinal slots 32 engaged by the feather key 30. The threaded sleeve 34 has its outer thread 35 screwed into the housing i and can be fixed in place by the feather key 30 in those positions in which the longitudinal slots 32 are aligned with the feather key 30.

The initial stress of the spring 11 can be increased by advancing the axial disk 31 by a total of three axial pins 36 acting in this way. The axial pins 36 are slidably guided in bores in the threaded sleeve 34, and their ends opposite the feather key bear against a set collar 40 which can be adjusted in an axial direction along a threaded end 38 of the threaded sleeve 34. The axial adjusting distance of the set collar 40 is limited, on the side of the feather key, by an end face 57 of the threaded sleeve 34, and on the opposite side by a stopper ring 41 mounted on the threaded sleeve 34, at the end of the threaded end 38. The set collar 40 is drivingly connected to the indexing ring 18 of the first setting means 28 by a mating ribs 39.

Now, when the tripping torque of the first setting means is adjusted by means of the indexing ring 18, the initial stress of the spring 11 is varied simultaneously. The initial stress of the spring 11 is adjusted in the manner described before so that the clutch 29 will not respond in soft screwing applications, and the motor will be switched off by the first setting means when the predetermined torque is reached. On the other hand, in hard screwing applications, the spring 11 will yield, and the clutch 29 will be released when the predetermined torque is reached so that the balls 9 will withdraw from the rollers 6 until they come to engage the next space between the rollers.

The shaft 20 is supported on both ends in a manner similar to the embodiment illustrated in FIG. 1. The transmission end of the shaft is held by the injection-molded bearing bush 4 in the planet wheel carrier of the second transmission stage. At its other end, a bearing bush 16 is fixed on its transmission end by a circlip ring 12 and, on its opposite end, by balls 37 bearing against a suitably shaped shoulder 42 of the shaft 20. The bearing bush 16 is held in a central bore of the threaded sleeve 34. The arrangement is sealed from the outside by an O-ring 43 fitted between the shaft 20 and the threaded sleeve 34 in a suitably shaped annular groove provided in the shaft.

Given the fact that in the case of the embodiment according to FIG. 2, the threaded sleeve 34 is fixed by the feather key in a predetermined screwing position, against separate rotation, and that the initial stress of the spring 11 is indirectly varied via the axial pins 36 when the set collar 40 is rotated on the threaded end 38, the position of the shaft 20 will remain unchanged when varying the prestress of the spring. In the case of the embodiment according to FIG. 1, in contrast, any variation of the prestress of the spring will also entail a corresponding axial movement of the shaft. Given the very small adjusting path, which is in the millimeter range, this movement can, however, be tolerated without any difficulty.

In the case of the embodiment according to FIG. 3, the screwing machine, being generally identical to the design according to FIG. 2, is modified insofar as an additional sliding sleeve is arranged before the indexing ring 18, by means of which the prestress of the spring 11 can be varied independently of the position of the indexing ring 18. Such an arrangement is desirable if the user is to be given the possibility, in hard screwing applications, to increase the prestress of the spring so that the clutch will respond later, and the motor will be switched off only when a higher torque is reached, in which case the angular momentum of the transmission is utilized to achieve a higher torque and, thus, to obtain a correspondingly raised torque curve (compare curve C in FIG. 5).

Similar to the embodiment according to FIG. 2, the axial pins 36 can be displaced toward the spring 11, by rotating the set collar 50 on the threaded end 38 of the threaded sleeve 34, in order to increase the prestress of the spring 11. The set collar 50 is a little wider, compared with the before-described embodiment, and is provided with a driving toothing 54 on its outer face which is engaged by the sliding sleeve 52 so that the latter can be displaced in the axial direction while simultaneously the sliding sleeve 52 and the set collar 50 remain safely connected for common rotation. The sliding sleeve 52 is loaded toward the indexing ring 18 by a spring 51 whose outer end facing away from the transmission bears against a snap ring 53. Thus, the sliding sleeve 52 is normally in contact with the indexing ring 18. In this rest position, the sliding sleeve 52 is connected to the indexing ring 18 by ribs 39 engaging corresponding central ribs of the indexing ring 18 so that the indexing ring 18 and the set collar 50 are altogether connected for common rotation.

Now, when the sliding sleeve 52 is withdrawn from the indexing ring 18, against the action of the spring, until the ribs 39 are longer in engagement with the ribs of the indexing ring 18, then the sliding sleeve 52 and, thus, the set collar 50 can be rotated independently of the indexing ring 18 so that the initial stress of the spring 11 can be varied independently of the angular position of the indexing ring 18. Thereafter, the sliding sleeve 52 can return from this adjusting position to its rest position under the action of the spring 51, until the ribs are again in engagement, and the sliding sleeve is again in contact with the indexing ring 18.

Figure 4:
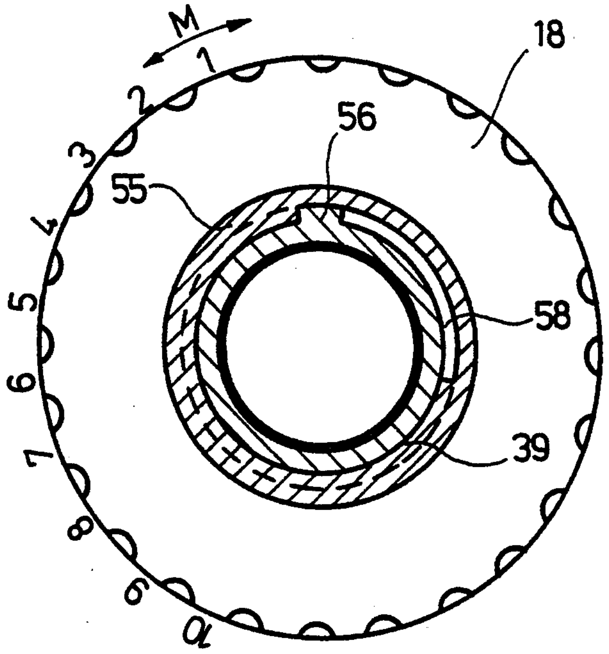
FIG. 4 shows a section along line IV—IV in FIG. 3.

In order to ensure that the prestress of the spring 11 can be varied only within a predetermined range, there is provided an encoding disk 55, which is fixed on the indexing ring 18 and which—according to FIG. 4—is configured as a segment-shaped link guide 58 engaged by a cam 56 of the sliding sleeve 52.

Figure 5:
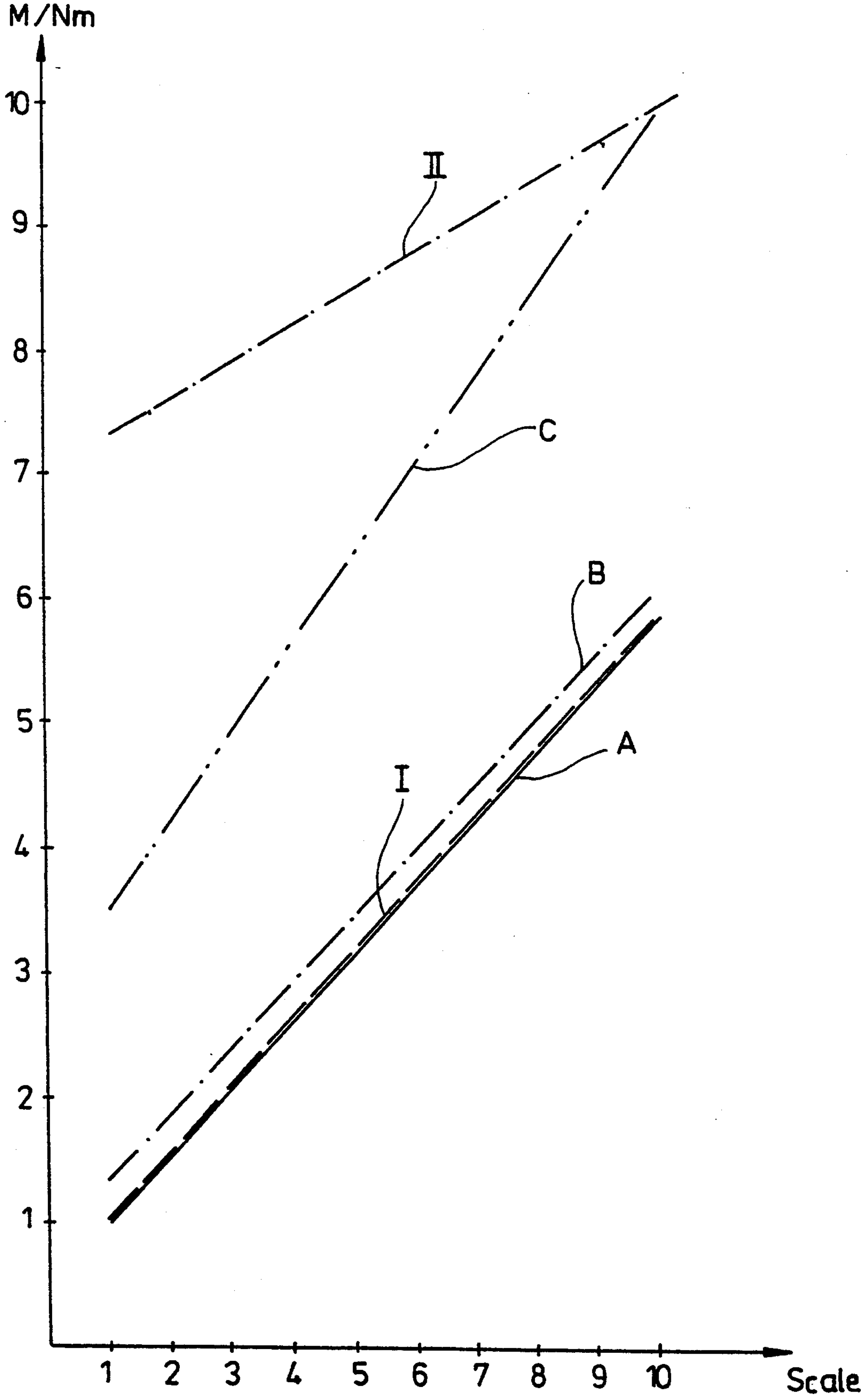
FIG. 5 shows a comparison between the torque curve of a screwing machine according to the invention, as a function of the setting for different screwing applications, by comparison with the torque curve of a screwing machine according to the prior art, without the clutch according to the invention.

FIG. 5 shows the torque curves of a screwing machine according to the invention, as illustrated in FIGS. 1, 2 or 3, as a function of the scale setting of the first setting means, the torque being plotted on the ordinate, while the scale setting of the first setting means is plotted on the abscissa—which corresponds to the respective angular position of the link ring of the first setting means and, thus, to a given prestress of the torque rod for switching off the motor via the shift fork. Curve A shows the development of the torque for a soft screwing application. Curve B shows the development of the torque for a hard screwing application, and with a relatively low prestress of the spring 11 (normal case). It can be seen that the torque curve of the screwing machine according to the invention is approximately identical for hard and for soft screwing cases, regardless of the amount of the additional angle of rotation.

When the prestress of the spring 11 is increased, the clutch according to the invention will respond in a hard screwing case only at higher torques, resulting in a raised torque curve for hard screwing applications (curve C). For a soft screwing application, on the other hand, the torque curve is again identical to curve A, even though the prestress of the spring 11 has been increased.

For comparison, the torque curves of a screwing machine according to the prior art have been given, curve I representing the soft screwing case, curve II representing the hard screwing case. The design of the screwing machine is absolutely identical to that of the screwing machine according to the invention, except for the clutch according to the invention. While the torque curves for the soft screwing case are practically identical for the screwing machine according to the invention (curve A) and for the screwing machine of the prior art (curve I), the torque curve of the screwing machine of the prior art is strongly raised for the hard screwing case. Adjusting the conventional screwing machine to a torque curve approximated to the soft screwing case is not possible. With increased initial stress and the torque adjusted to its maximum, the screwing machine according to the invention provides the same torque in a hard screwing application as the conventional screwing machine, because in this case the cutoff action is tripped by the first setting means only, full use being made of the angular momentum.

I claim:

1. A portable electric screwing machine with a variable torque setting, comprising:
   - a housing;
   - a motor within said housing;
   - a transmission coupled to said motor for driving a tool shaft;
   - de-energizer means operably connected with said transmission for de-energizing said motor at a preset torque;
   - first setting means operably connected with said de-energizer means for presetting said de-energizer means to a desired first torque, at which said de-energizer means is activated;
   - a clutch arranged between said transmission and said tool shaft, said clutch having a variable tripping torque for decoupling the driving of said tool shaft by said transmission at a preset second torque; and
   - second setting means operably connected with said clutch for presetting said second torque, and operably connected with said first setting means for a corresponding setting of said first torque preset by said first setting means and of said second torque preset by said second setting means for substantially equal tightening torque regardless of counter-torque due to fasteners.

2. A machine according to claim 1, wherein said clutch comprises two clutch halves which can be connected one with the other in form-locking relationship, and further comprising spring means for biasing said clutch halves towards each other.

3. A machine according to claim 2, wherein said clutch is arranged coaxially with said tool shaft.

4. A machine according to claim 2, wherein said clutch halves comprise rolling elements engaging each other in form-locking relationship.

5. A machine according to claim 4, wherein a first one of said two clutch halves includes a roller retainer in which a plurality of rollers is held in rolling relationship, and wherein a second one of said two clutch halves comprises a corresponding number of balls engaging said rollers in form-locking relationship.

6. Machine according to claim 5, wherein said roller retainer is designed in the form of a flange, wherein each of said rollers is rotatable about an axis of rotation, and wherein said rollers are arranged on said roller retainer in such a way that the axes of rotation of said rollers point radially outwardly from said roller retainer.

7. A machine according to claim 1, wherein said transmission is a planetary gearing.

8. A machine according to claim 2, wherein said transmission is a planetary gearing including an internal gear cylinder which is rotatably seated within said housing and is non-rotatably connected to a first one of said two clutch halves, while a second one of said two clutch halves is fixed within said housing.

9. A machine according to claim 8, wherein said transmission comprises a multi-stage planetary gearing including a first gear stage driven by said motor, and a second gear stage driven by said first gear stage and driving said tool shaft, wherein said first gear stage includes a first internal gear cylinder which is rotatably seated within said housing and which engages said de-energizer means allowing a limited rotation of said first internal gear cylinder caused by a torque acting thereon for activating said de-energizer means when a certain torque is reached preset by said first setting means, said second gear stage including a second internal gear cylinder comprising the gear cylinder which is rotatably seated within said housing and which is connected non-rotatably with said first clutch half.

10. A machine according to claim 2, wherein said second setting means includes an adjusting nut which is threadably connected to said housing for adjustment in an axial direction, and wherein said spring means comprises a compression spring supported by said adjusting nut on one side thereof and supported by one of said two clutch halves on the other side thereof.

11. A machine according to claim 10, wherein said first setting means comprises an indexing ring which is connected in driving relationship to said adjusting nut for a common adjustment with said second setting means.

12. A machine according to claim 2, including a threaded sleeve which is screwed into said housing, said threaded sleeve carrying pins extending axially, said pins having first ends supporting said spring means on one side thereof which is supported by one of said two clutch halves on another side thereof, said threaded sleeve further carrying a set collar which is mounted on said threaded sleeve, said set collar supporting said pins on second ends thereof, said second ends being opposite said first ends of said pins, said set collar being axially adjustable on said threaded sleeve for adjusting the bias of said spring means exerted on said clutch half.

13. A machine according to claim 12, wherein said set collar is screwed upon a threaded end of said threaded sleeve, and is connected with an indexing ring of said first setting means to rotate therewith.

14. A machine according to claim 13, wherein said set collar has an axial adjusting travel which is limited on both sides.

15. A machine according to claim 14, wherein said threaded sleeve comprises a radial end face facing said set collar for limiting the axial adjustment travel thereof towards said spring element, and wherein a stopping means is provided on said threaded sleeve for limiting the axial adjustment travel of said set collar into a direction opposite said spring element.

16. A machine according to claim 15, wherein a mating means is provided between said set collar and said indexing ring for drivingly connecting said set collar and indexing ring.

17. A machine according to claim 2, wherein said spring means is configured as a cup spring.

18. A machine according to claim 8, wherein said de-energizer means includes a torsion spring extending in axial direction alongside and sideways of said planetary gearing for generating a spring force, and wherein said torsion spring carries at one end thereof a swivel element which engages a cam on said internal gear cylinder and which is held at an opposite end in a support, said swivel element being able to swivel out of an initial position against the action of the force of said torsion spring for actuating said de-energizer means to cut off said motor.

19. A portable electric screwdriver with a variable torque setting, comprising:

a housing containing a motor;

a transmission coupled to said motor for driving a tool shaft;

de-energizer means operably connected with said transmission for de-energizing said motor at a preset torque;

first setting means operably connected with said de-energizer means for presetting said de-energizer means to a desired first torque, at which said de-energizer means is activated;

a clutch arranged between said transmission and said tool shaft, said clutch comprising two clutch halves which can be connected with one another in form-locking relationship and spring means for biasing said clutch halves towards each other, said clutch having a variable tripping torque for decoupling the drawing of said tool shaft by said transmission at a preset second torque;

second setting means operably connected with said clutch for presetting said second torque, and operably connected with said first setting means for a common setting of said first torque preset by said first setting means and of said second torque preset by said second setting means;

a threaded sleeve screwed into said housing and carrying a plurality of axially extending pins, said pins having first ends supporting said spring means on one side thereof, another side of said spring means being supported by one of said two clutch halves, said threaded sleeve further carrying a set collar which is screwed upon a threaded end of said threaded sleeve and is connected with an indexing ring of said first setting means to rotate therewith, said set collar supporting said pins on second ends thereof which are opposite said first ends of said pins, said set collar being axially adjustable on said threaded sleeve for adjusting the bias of said spring means exerted on said clutch half;

wherein a spring-loaded sliding sleeve is axially and displaceably arranged on said set collar, said sliding sleeve engaging said set collar for common rotation therewith, wherein said sliding sleeve engages said indexing ring for common rotation therewith when in a first axial resting position, and wherein said sliding sleeve is retractable against said spring-load from its resting position into a second adjusting position, in which said indexing ring is rotatable against said sliding sleeve, thereby allowing rotation of said collar with respect to said indexing ring for varying the bias of said spring means resulting in an adjustment of said second torque preset by said second setting means independently from said first torque preset by said first setting means.

20. A machine according to claim 19, wherein means are provided for limiting the angle of adjustment of said sliding sleeve relative to said indexing ring.

21. A machine according to claim 20, wherein an encoding disk is fixed on said indexing ring, said encoding disk being provided with a segment-shaped link guide which is engaged by a cam provided on said sliding sleeve for limiting the angle of rotation of said indexing ring.

* * * * *